May 5, 1959   J. E. DUFF   2,885,223
TELESCOPIC TUBE COUPLING WITH STEP ADJUSTMENT MEANS
Filed Oct. 8, 1956
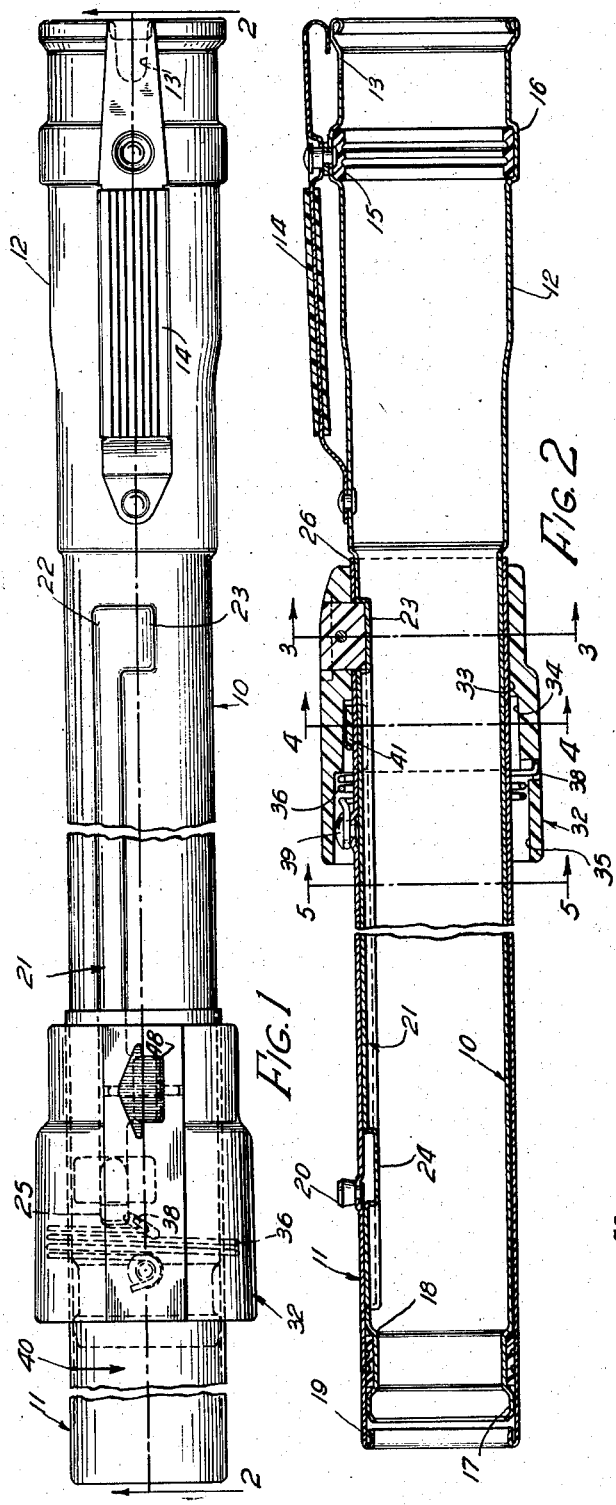

United States Patent Office 2,885,223
Patented May 5, 1959

2,885,223

TELESCOPIC TUBE COUPLING WITH STEP ADJUSTMENT MEANS

Jack E. Duff, Canton, Ohio, assignor to The Hoover Company, North Canton, Ohio, a corporation of Ohio Application October 8, 1956, Serial No. 614,711

3 Claims. (Cl. 285—7)

The present invention relates to a coupling for telescoped tubes.

An object of the invention is to provide a coupling for locking telescoped tubes in different extended positions and to also prevent relative rotation of the tubes. Another object is to provide a coupling which is operated automatically to lock the telescoped tubes in collapsed and extended positions. A further object is to provide a coupling having a rotatable sleeve to lock telescoped tubes in a variety of positions and also prevent relative rotation between the tubes. Other objects and advantages of the invention will become apparent from the following description and drawings wherein:

Figure 1 is a plan view showing the telescoped tubes in extended position.

Figure 2 is a section along the lines 2—2 of Figure 1.

Figures 3, 4 and 5 are sections along the lines 3—3, 4—4 and 5—5 in Figure 2, and Figure 6 is a plan view of part of the outer tube located beneath a locking sleeve.

The embodiment of the invention herein disclosed comprises an inner tube 10 and an outer tube 11 mounted for telescopic movement and adapted to convey air to and from a suction cleaner. The exposed end 12 of the inner tube 10 has a marginal slot 13 and a cooperating leaf spring latch 14 for receiving the pin of an unshown cleaning tool which seats within a sealing member 15 mounted in an annular rib 16. At the other end 17 of the inner tube is an annular member 18 which engages the inner surface of the outer tube 11 to provide a substantially air tight seal therebetween. The end 19 of the outer tube 11 is provided with a pin 20 for attachment to an unshown suction cleaner or hose in a manner well known in the art.

In the outer surface of the inner tube 10 is an elongated groove 21 terminating at one end 22 in an offset latch receiving or locking recess 23 and a similar recess 24 is positioned short of the opposite end 25 of the groove 21.

Adjacent the end 26 of the outer tube 11 is a lock opening 27 and spaced inwardly therefrom is a tube guide opening 28, and the edges 29 and 30 respectively of the openings are in alignment.

Rotatably mounted on the outer tube 11 is a locking sleeve 32 having a stepped inner surface, the surface 33 engaging the outer tube 11 and the surfaces 34 and 35 being spaced from the tube 11. The sleeve 32 is retained on the tube 11 by a torsion spring 36 disposed between the sleeve surface 35 and the tube, and the spring has one end anchored in an opening 38 in the sleeve while the opposite end is attached to a rivet 39 on the outer tube. The spring 36 tends to rotate the sleeve 32 in the direction indicated by the arrow 40 in Figure 1.

Arranged between the sleeve surface 34 and the outer tube 11 is the enlarged head 41 of a tube aligning or guide member 42 having a projection 43 which extends through the guide opening 28 into sliding engagement with the elongated groove 21, as shown in Figure 4.

The locking sleeve 32 is provided with an opening 44 in which is disposed a latch member 45 retained in fixed position by a pin 46 and has a projection 47 extending through the lock opening 27 for engagement with the groove 21 and the offset locking recesses 23 and 24. An arrow 48 is provided on the outer surface of the sleeve 32 to indicate to the operator the direction in which the sleeve must be manually rotated to disengage the latch member 45 from the locking recesses.

When the tubes are collapsed, as shown in Figure 2, they are locked in such position by the latch member 45 being arranged in the offset recess 23, and the member 45 is maintained in locked position by the torsion spring 36 exerting a force on the sleeve 32. Relative rotation between the two tubes is prevented by the guide member 42 being positioned in the groove 21 as clearly shown in Figure 4.

If it is desired to fully extend the tubes the operator grasps the end 12 of the inner tube 10 and rotates the sleeve 32 counterclockwise, as viewed in Figure 3, against the force of the torsion spring 36 to shift the latch member 45 out of the recess 23 into engagement with the edge 30 of the lock opening 27 for arrangement in the groove 21, thereafter the tubes can be telescoped outwardly and the guide member 42 and latch member 45 both slide in the groove 21. During extension of the tubes the guide member 42 passes the entrance to the offset recess 24 but is prevented from entering the latter because the latch member 45 is in the groove 21 and thus prohibits relative rotation of the tubes. When the latch member 45 is opposite the offset recess 24 the torsion spring 36 automatically rotates the sleeve 32 causing the latch member 45 to be moved into the recess 24 and lock the tubes in extended position. The guide member 42, when the tubes are fully extended, is at the end 25 of the groove 21 and thus prevents relative rotation of the tubes.

In order to collapse the tubes the operator grasps the inner tube 10 with one hand and places the other hand on the sleeve 32 and rotates the latter in the direciton indicated by the arrow 48 and such movement shifts the latch member 45 out of the recess 24 into the groove 21 whereby the operator's hands can be moved toward each other to fully collapse the tubes. When the tubes are fully retracted the torsion spring 36 automatically rotates the sleeve 32 to shift the latch member 45 into the recess 23 to thereby prevent extension of the tubes.

While I have shown and described but one embodiment of my invention, it is to be understood that this embodiment is to be taken as illustrative only and not in a limiting sense. I do not wish to be limited to the particular structure shown and described but to include all equivalent variations except as limited by the scope of the claims.

I claim:

1. A coupling comprising: inner and outer elongated members mounted for telescopic movement to extended and retracted positions, means defining an elongated groove in the outer surface of said inner member extending longitudinally thereof and terminating short of the ends of said inner member, means defining spaced latch receiving means offset to and connected with said elongated groove, a first and a second opening in said outer member, guide means mounted on said outer member and including a part projecting through and substantially fitting said first opening and projecting into said elongated groove, latch means rotatably mounted on said outer member and having a locking member projecting through said second opening, laterally movable therein and extending into said groove and for selective engagement, when moved laterally, in said spaced offset latch receiving means to lock said members in extended and retracted positions, said latch means having a portion overlying said guide means to retain the latter in said first opening in said outer member, said guide means and said locking member cooperating, when in said groove in said inner member, to prevent relative rotation of said members and axial separation thereof while permitting said telescopic movement, and means detachably securing said latch means on said outer member whereby disconnecting said latch means from said outer member exposes said guide means for removal of the latter from said first opening to permit complete separation of said members.

2. A coupling as described in claim 1, and said detachable securing means including resilient means biasing said latch means for rotation into said locking engagement with said spaced offset latch receiving means when disposed opposite the entrances thereto.

3. A coupling as described in claim 1, in which the side of said second opening opposite said offset latch receiving means is axially aligned with the corresponding side of said part of the guide means to prevent relative rotation of said members as said guide means passes one of the entrances to said offset latch receiving means while said members are being telescoped from extended to retracted positions.

References Cited in the file of this patent

UNITED STATES PATENTS

| | | |
|---|---|---|
| 219,098 | Jewell | Sept. 2, 1879 |
| 319,350 | Titus | June 2, 1885 |
| 573,695 | Penfield | Dec. 22, 1896 |
| 793,869 | Anderson | July 4, 1905 |
| 825,810 | Cooke | July 10, 1906 |
| 1,691,851 | McCuean | Nov. 13, 1928 |
| 2,667,371 | Holte | Jan. 26, 1954 |

FOREIGN PATENTS

| | | |
|---|---|---|
| 918,411 | France | Oct. 21, 1946 |